United States Patent
Shyu et al.

(10) Patent No.: US 10,467,400 B2
(45) Date of Patent: Nov. 5, 2019

(54) VISUAL STORYTELLING AUTHENTICATION

(71) Applicant: The Curators of the University of Missouri, Columbia, MO (US)

(72) Inventors: Chi-Ren Shyu, Columbia, MO (US); Hongfei Cao, Lake Forest, CA (US); Matthew Klaric, Burke, VA (US); Jeffrey Uhlmann, Holts Summit, MO (US)

(73) Assignee: The Curators of the University of Missouri, Columbia, MO (US)

( * ) Notice: Subject to any disclaimer, the term of this patent is extended or adjusted under 35 U.S.C. 154(b) by 274 days.

(21) Appl. No.: 15/517,343

(22) PCT Filed: Oct. 16, 2015

(86) PCT No.: PCT/US2015/056018
§ 371 (c)(1),
(2) Date: Apr. 6, 2017

(87) PCT Pub. No.: WO2016/061505
PCT Pub. Date: Apr. 21, 2016

(65) Prior Publication Data
US 2017/0300686 A1    Oct. 19, 2017

Related U.S. Application Data

(60) Provisional application No. 62/122,295, filed on Oct. 16, 2014.

(51) Int. Cl.
*G06F 7/04* (2006.01)
*G06F 21/36* (2013.01)
(Continued)

(52) U.S. Cl.
CPC ......... *G06F 21/36* (2013.01); *G06K 9/00604* (2013.01); *G06K 9/72* (2013.01); *H04L 63/06* (2013.01)

(58) Field of Classification Search
CPC ..... G06F 21/36; H04L 63/06; G06K 9/00604; G06K 9/72
(Continued)

(56) References Cited

U.S. PATENT DOCUMENTS 5,608,387 A    3/1997 Davies
8,594,374 B1 *  11/2013 Bozarth ................. G06F 21/36
                                                        382/103
(Continued)

FOREIGN PATENT DOCUMENTS

GB         2490864 A    11/2012

OTHER PUBLICATIONS

PCT Patent Application PCT/US2015/056018 International Search Report and Written Opinion dated Feb. 4, 2016.

*Primary Examiner* — Mohammad W Reza
(74) *Attorney, Agent, or Firm* — Erise IP, P.A.

(57) ABSTRACT

Method, system and media for authenticating a subject as a user. Embodiments generate visual stories specific to the user and for which the subject must select the corresponding images from among a plurality of decoy images. Gaze tracking can be used to determine which images the user has selected without allowing an observer to learn which images have been selected. Images for the visual story can be retrieved from the user's social networking profile, and corresponding text storied generated to indicate which images should be selected. Multiple security levels are possible by varying the number of story images and decoy images.

20 Claims, 4 Drawing Sheets

(51) Int. Cl.
*G06K 9/72* (2006.01)
*G06K 9/00* (2006.01)
*H04L 29/06* (2006.01)

(58) Field of Classification Search
USPC .......................................................... 726/6
See application file for complete search history.

(56) References Cited

U.S. PATENT DOCUMENTS

| | | | |
|---|---|---|---|
| 8,856,541 B1* | 10/2014 | Chaudhury | G06F 21/32 |
| | | | 382/115 |
| 2010/0058437 A1* | 3/2010 | Liew | G06F 21/36 |
| | | | 726/2 |
| 2011/0154482 A1* | 6/2011 | Heiner | G06F 21/36 |
| | | | 726/19 |
| 2013/0145441 A1 | 6/2013 | Mujumdar et al. | |
| 2013/0174240 A1* | 7/2013 | Bidare | H04L 9/3271 |
| | | | 726/7 |

* cited by examiner

VISUAL STORYTELLING AUTHENTICATION

RELATED APPLICATIONS

This patent application claims priority benefit, with regard to all common subject matter, of earlier-filed PCT Int'l. App. No. PCT/US2015/056018, filed Oct. 16, 2015, and entitled "VISUAL STORYTELLING AUTHENTICATION," which claims priority to U.S. Provisional Patent Application No. 62/122,295, filed Oct. 16, 2014, and entitled "GAZE TRACKING-BASED VISUAL STORYTELLING SECURITY AUTHENTICATION." The identified earlier-filed PCT and provisional patent applications are hereby incorporated by reference in their entirety into the present application.

GOVERNMENT LICENSE RIGHTS

This invention was made with government support under Grant 0812515 awarded by the National Science Foundation of the United States of America. The U.S. government has certain rights in the invention.

BACKGROUND

1. Field

Embodiments generally relate to authenticating a subject as a user and, more particularly, to randomly generating visual stories specific to the user and for which the subject must select the corresponding images from among a plurality of randomly selected decoy images, select the correct region of a single image, or select the images matching a criterion from among a set. The type of authentication, and the number of decoy images can be varied according to the level of security required in a given application.

2. Related Art

Traditionally, text-based passwords using alphanumeric characters and symbols have been used for authentication in computer systems. However, text-based passwords are problematic because users typically choose them to be short and easily remembered. Such passwords can be easily guessed or subject to brute-force password-guessing attacks. Long and complicated passwords, while providing more security, are difficult for users to remember. As such, many attempts have been made to replace text-based passwords with alternative authentication technologies. However, none of these previous attempts has combined the necessary security and ease of use to supplant text-based passwords.

SUMMARY

To address the above-describe problem, embodiments disclosed herein combine elements of biometric and storytelling techniques to replace traditional, text-based password authentication. With dynamic authentication messages (i.e., stories), the disclosed system provides accurate identification and robust usability. In a first embodiment, a method of authenticating a subject as a user is provided, comprising the steps of retrieving a story image associated with the user and metadata associated with the story image, retrieving a plurality of decoy images based on the story image, generating a text story based on the metadata associated with the story image, presenting, to the subject, the text story and a set of images comprising the story image and the plurality of decoy images, receiving, from the subject, an indication of a selected image of the set of images, and authenticating the subject as the user if the selected image corresponds to the story image.

In a second embodiment, a system for authenticating a subject as a user is provided, comprising a display for displaying a story image associated with the user and a plurality of decoy images, a gaze tracker for detecting a gaze path of the subject as the subject views the display, an eye movement classifier for identifying a fixation point of the gaze path, a region-of-interest mapper for determining an indicated image based on the fixation point, and a scoring engine for determining an authentication score based on the indicated image.

In a third embodiment, one or more non-transitory computer-readable media storing computer-executable instructions are provided which, when executed by a processor perform a method of authenticating a subject as a user, comprising steps of retrieving a plurality of story images from the user's social media profile and metadata associated with each of the plurality of story images, retrieving a plurality of decoy images based on the plurality of images from the user's social media profile, generating a story based on the metadata associated with each of the plurality of story images, presenting, to the subject, the story and a set of images comprising the plurality of story images and the plurality of decoy images, tracking the user's gaze on the set of images to obtain a gaze scan path, analyzing the gaze scan path to determine a plurality of fixation points, authenticating the subject as the user if the plurality of fixation points correspond to the plurality of story images.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

BRIEF DESCRIPTION OF THE DRAWING FIGURES

Embodiments are described in detail below with reference to the attached drawing figures, wherein.

Figure 1:
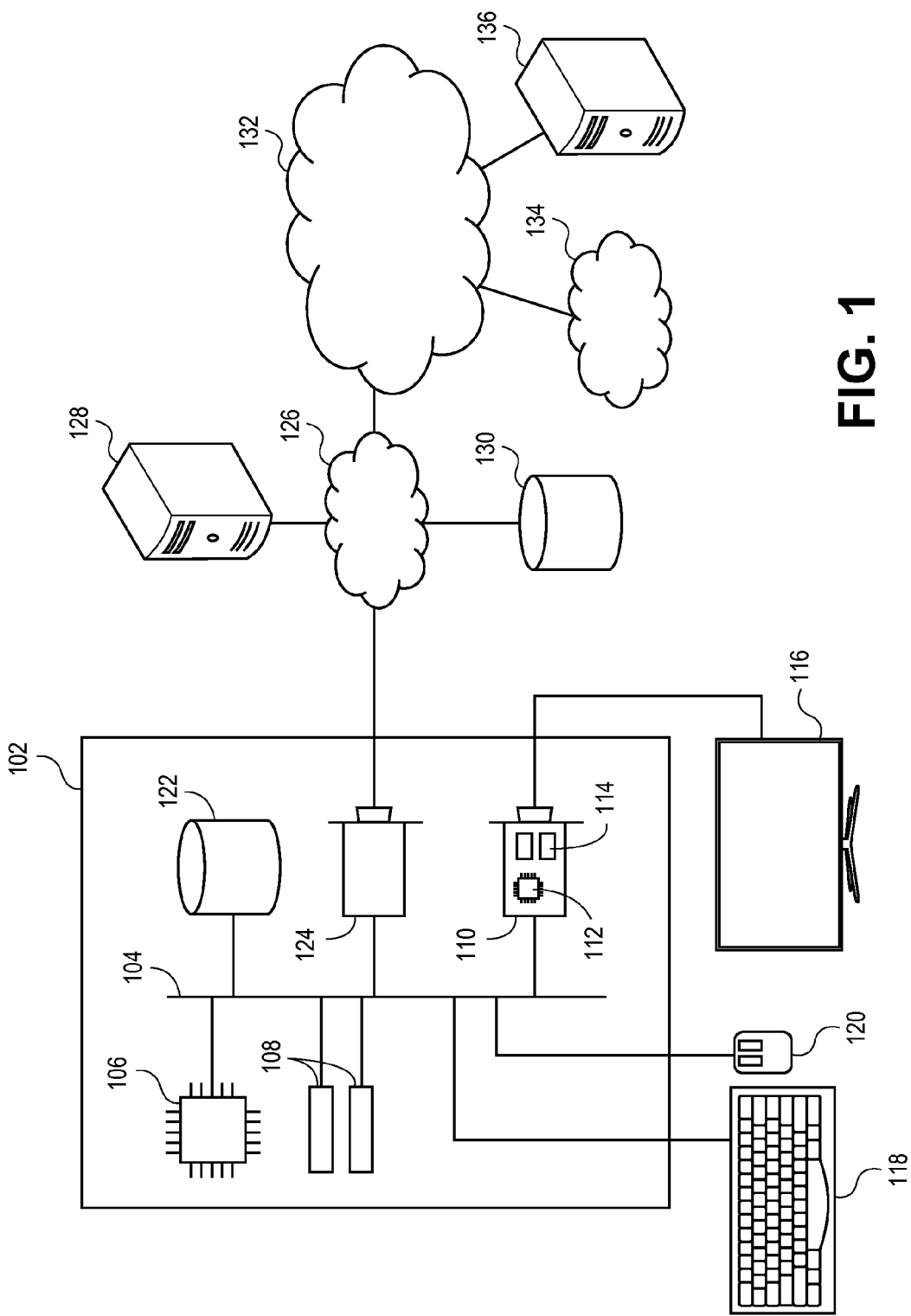
FIG. 1 depicts an exemplary hardware platform for certain embodiments.

The drawing figures do not limit the invention to the specific embodiments disclosed and described herein. The drawings are not necessarily to scale, emphasis instead being placed upon clearly illustrating the principles of the invention.

DETAILED DESCRIPTION

At a high level, the techniques disclosed herein replace authentication requiring a user to memorize a password with authentication based on information the user already knows. For example, a user can recognize their friends, co-workers, the places they have lived, and so forth. An impostor attempting to authenticate as the user will not generally know this information. Furthermore, if new information is used for each authentication, the impostor cannot simply observe the user authenticating and replicate their response. One source of such new information is the user's social networking profile. For example, if the user accepts a Facebook invitation to an event named "Dana's 21st Birthday Party," and then posts pictures of that event, then the user will subsequently be able to indicate the correct image from among a variety of similar images when asked "Which of these is your friend Dana's 21st Birthday Party?" An impostor is unlikely to be able to do so, especially if successful authentication requires indicating multiple correct images in a sequence.

Recent advances in gaze tracking technology render it ideal for use by a subject authenticating as a user and add additional security to the system. While the subject could indicate the correct image using a mouse, a touchscreen, or other peripheral, a nearby observer could learn some of the information the provided by the user to authenticate. Using gaze tracking, however, even a close observer will be unable to determine which images the user has indicated. If desired, the biometrics of the subject's gaze can provide additional authentication.

The subject matter of embodiments is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art and are intended to be captured within the scope of the claims. Terms should not be interpreted as implying any particular ordering of various steps described unless the order of individual steps is explicitly described.

The following detailed description of embodiments references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

Turning first to FIG. 1, an exemplary hardware platform for certain embodiments is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules. Also attached to system bus 104 is graphics card 110. In some embodiments, graphics card 104 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media and may be internally installed in computer 102 or externally and removeably attached.

Computer-readable media include both volatile and nonvolatile media, removable and nonremovable media and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
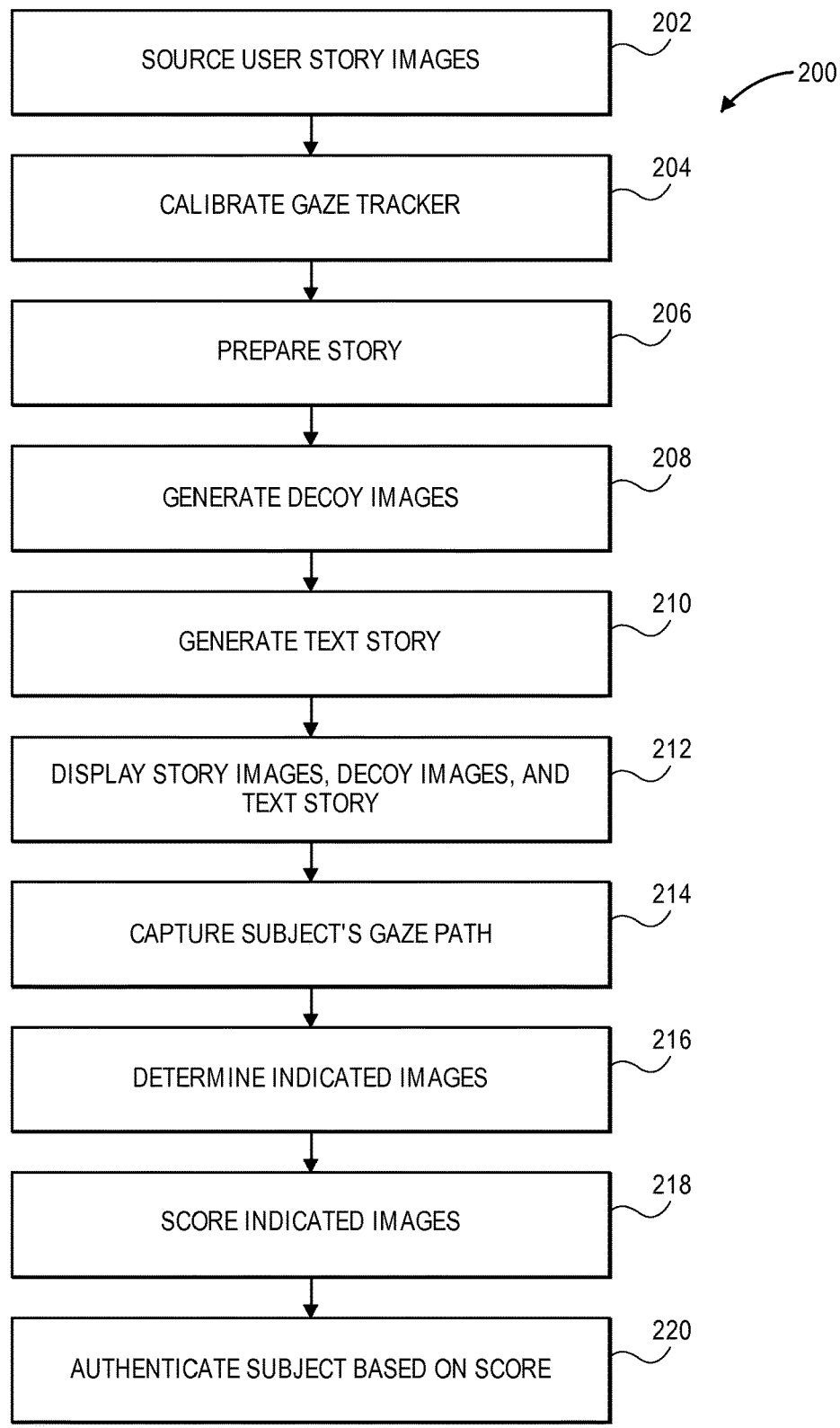
FIG. 2 depicts a flowchart illustrating the operation of a method for authenticating a subject as a user.

Turning now to FIG. 2, a flowchart illustrating the operation of a method for authenticating a subject as a user is depicted and referred to generally by reference numeral 200. As used herein, a user is the holder of an established account on a computer, service, or platform being accessed. A subject is someone who claims to be a particular user and requires authentication to establish the veracity of this claim. For example, in traditional password authentication system, the user establishes a username and password to access an online service. Anyone who subsequently provides that username is a subject who can authenticate as the user by providing the password.

The method begins by enrolling the user in the authentication system. In some embodiments, this enrollment may be a part of the process of account creation. In other embodiments, authentication in accordance with embodiments may be configured for existing accounts. Enrollment begins with a step 202 of sourcing user story images for use in subsequent authentications. As discussed in greater detail below, story images, as used herein, refers to images used in constructing the visual stories which are used to authenticate the subject.

In some embodiments, story images for the user can come from one or more of the user's social networking profiles. In such embodiments, sourcing images is done by the user providing one or more social media account identifiers and/or login credentials. The associated social networking profiles can then be used as a source of story images for authentication. Metadata for the story images and story generation may also be derived from the user's social networking profile. For example, the user's friends list, education history, birthday, events and so forth can be used for story generation, as discussed below. In some embodiments, the user instead provides the authentication system with permission to access the relevant information from their social networking profile via an application programming interface (API). For example, the use might grant the system access to their email address, birthday, education history, location, events, photos, friend list, friends' education histories, friends' location, friends' photographs, and/or friends' hometowns for use in generating stories.

In other embodiments, the user can provide (and, as discussed in greater detail below, provide metadata for) their own story images. This can be useful where, for example, the user does not have a social networking profile, or does not wish to use their social networking profile for authentication. For example, users can upload personal photographs or albums containing pictures of their travels, childhood events, past residences, social activities, and so forth. In some embodiments, users can continue to provide additional images for use with the authentication system on an ongoing basis. In still other embodiments, images can be selected from among images stored locally on the system to which the subject is authenticating, or from an image repository on the intranet of organization controlling the network to which the subject is authenticating.

Enrollment then proceeds to a step 204 of calibrating the gaze tracker for the user. The gaze tracker is discussed in greater detail below with respect to FIG. 3. As part of enrollment, the user is directed to look at predetermined locations on a display while the gaze tracker captures images of their eyes. By using this baseline information, the gaze tracker can determine where on the screen the subject is looking during the authentication process. In some embodiments, the calibration process may need to be refreshed periodically. In other embodiments, the calibration process may be a part of each authentication attempt.

Once the enrollment process is completed, processing can proceed to the story creation process, which begins at step 206, where the story is prepared. Broadly speaking, a story (also referred to as a visual story) is a series of visual cues or images from the images previously sourced. The story images, together with decoy images, are presented to the subject wishing to authenticate, together with a textual representation of the story. By selecting the story images corresponding to the text story (for example, by looking at them), the subject is authenticated as the user.

At step 206, the story images to be used in the story are selected. In some embodiments, the number of story images selected can vary and is determined by the security level of the service being accessed. For example, logging into a website to leave a comment on a post may only require a single story image, while accessing an online bank account might require six story images. These images can be selected in real time from the user's social networking profile, or retrieved from a prepopulated data store. Metadata (i.e. data describing the story images) is also retrieved at this step and can include data describing who is in the image, where the image was taken, when the image was taken, and what objects appear in the image. The textual representation, when it is generated as described below, can incorporate information from any of these categories.

Once the story images have been selected, processing can proceed to a step 208 where the decoy images for the story are selected. Broadly speaking, decoy images are any images that are not a part of the story and, when selected by a subject, may indicate that the subject is not the user they claim to be. To ensure that only genuine subjects can authenticate, decoy images should be selected to be similar to the pool of story images. This may include similarities in terms of color, texture, shapes, types of objects present, locations present in the images, or the time of image capture. The number of decoy images present, or the ratio of decoy images to story images, can also be used as a parameter for tuning the strength of the authentication based on a needed security level. In the example above, logging in to leave a comment might involve one decoy image per story image, while online banking might involve four or more decoy images per story image.

In some embodiments, decoy images can be selected form the user's pool of images but be non-responsive to the story. In other cases, decoy images can be selected from the story images of other users of the authentication system. In still other embodiments, the images can be chosen from public image repositories, such as PASCAL or Google Image Search. Thus, for example, if a story calls for a subject to select a picture of a friend, then the decoy image could be selected from the "person" category of the PASCAL image database. Similarly, if the metadata accompanying a story image indicates that the images is of a "pavilion," then "pavilion" could be used as a search term in a Google Image Search to identify potential decoy images.

Processing can then proceed to step 210 where a text story corresponding to the story images is generated. In some embodiments, one text story is generated for all of the story images selected (for example, "Find your University of Missouri friends."). In other embodiments, a separate text story is generated for each story image (for example, "Which one of these is your most recent Facebook event?"). In still other embodiments, multiple text stories are generated, each corresponding to multiple story images. Any form of sentence generation can be used to generate the text story, including appropriately constrained context-free grammars and, as described below, link grammars. In some embodiments, multiple archetypes (or sentence types) for text stories can be selected from. For example, declarative text stories, interrogative text stories, and imperative text stories may all be available and each of these archetypes may have their own set of generation rules.

Once an archetype has been selected for a story, a grammar rule of the appropriate type can be selected. The form of a rule will depend on the type of grammar used to generate a sentence. For example, Table 1 below shows sample link rules suitable for use with a link grammar. In a link grammar, words are grouped by part of speech (or role in the sentence being constructed) and represented by letters or short sequences of letters. Each of these representations then indicates what other representation it can appear next to on its left (using a "−") and right (using a "+"). For example, articles (e.g., "a" and "the") might have the rule "D+" meaning that they must be placed to the left of a word that has a "D−" link. Nouns (e.g., "cat" and "dog") might have the rule "D−& (O− or S+)," meaning they need a word with a D+ link on their left and either a word with an O+ link on their left or a word with an S− link on their right. Transitive verbs (e.g., "chased") might have the rule "S−& O+," meaning they need a word with an S+ link on their left and a word with an O− link on their right.

Thus, because the article "a" has a D+ link and the word "dog" has a D− link, they can be placed next to each other to form the phrase "the dog," which still needs to be placed to the left of a word with an S− link or to the right of a word with an O+ link. The verb "chased" has such an S− link, so the phrase "the dog chased" can be formed and needs to be followed by a phrase with an O− link. The phrase "the cat" can be formed similarly to the phrase "the dog" as discussed above and has such an O− link. Thus the phrase "the cat chased the dog" can be formed and having no unsatisfied linking requirements, is a complete sentence. Once of skill in the art will appreciate that this is, of necessity, a brief and abbreviated summary of link grammars and is referred to "Parsing English with a Link Grammar" by Sleator and Temperley for further information.

Once the text story has been created, it can be displayed at step 212, together with the story images and the decoy images, to the subject wishing to authenticate, as depicted below in FIG. 4. Because a variety of sentences can be generated, a variety of subjects can be selected to chosen to play each role in the sentence, and a variety of images may be available of each subject, each story display can be essentially unique such that an impostor cannot authenticate as a user even after seeing the user authenticate many times.

The authentication process continues at a step 214 where the subject's gaze is tracked to determine which of the images presented the subject is looking at. In some embodiments, the gaze is tracked using an infrared camera as previously calibrated for the user at step 204. The gaze path can be represented by a list of time-stamped points, by a list of points captured at a known frequency, or otherwise.

Next, at step 216 it is determined which of the displayed images the subject has indicated. In some embodiments, this is done using the gaze path captured at step 214. In other embodiments, the subject can indicate the desired images using a peripheral such as a keyboard, mouse, or touch screen and no gaze path need be captured at step 214. In embodiments using the gaze path, the gaze path data is first processed to determine fixation points. For example, if all of the gaze points for a 150 ms period fall within a particular radius of a given point, then that point may be identified as a fixation point. Fixation points can be identified by a temporal-based, duration-sensitive algorithm, by a spatial-based algorithm, or by any other algorithm now known or later developed. In some embodiments, fixations may be separated from saccades and the later discarded. For additional information describing the identification of fixation points based on gaze data, the reader is referred to "Identifying Fixations and Saccades in Eye-Tracking Protocols," by Salvucci and Goldberg.

Once the fixation points of the gaze path have been identified, they can be mapped to regions of interest of the displayed story. In some embodiments, a region of interest corresponds to an entire story image or decoy image that has been displayed. In other embodiments, the region of interest can be a specified area within a displayed image. For example, if the story requires a subject to identify a particu-

| Rule Number | Link Rules | Sentence Type | Sample Sentence |
| --- | --- | --- | --- |
| 1 | Ds+Ds−Ss+Ss−(O+(D+D−)O−) | Declarative | A friend went to a playground. |
| 2 | S+S−(D+(A+A−)D−) | Declarative | You work on a recent project. |
| 3 | Ss+Ss−O+(A+A−)O− | Interrogative | Who is your grandfather? What is your birthday? |
| 4 | Bsw+(SI+SI−)Bsw− | Interrogative | Who did you live with? |
| 5 | S+S−O+(A+(A+A−)A−)O−) | Imperative | Find your MU friends |
| 6 | S+S−O+(A+(A+A−)A−)O− | Imperative | Find your recent posted picture. |
| 7 | S+(A+(A+A−)A−)S−J+J− | Imperative | Choose recent visited placed in order of time. |

After choosing a grammar rule for constructing the text story (such as one of those shown in Table 1), words corresponding to each element of the rule are selected. For example, if the grammar rule for the sentence is given by "D+D−S+S−(O+(D+D−) O−)" (where the parentheses determine the order of combination), then the sentence "the dog chased the cat" could be generated. Alternatively, the sentence "a cat chased the dog" could be generated. In this way, sentences containing objects present in the story images can be created, which are equally plausibly satisfied by objects present in the decoy images.

lar friend, and the story image contains multiple people, the region of interest may be only the portion of the image containing that friend. In some embodiments, fixation points falling outside any region of interest can be discarded. For example, the subject may look at a story image and then look at the text story again to determine the next story. In that case, the fixation point corresponding to the text story can be discarded from the sequence of fixation points as being irrelevant to image selection. In this way, a string of story images (or regions of story images) can be identified as being the subject's indicated images.

Once the string of indicated images has been determined, the subject's authentication score can be calculated at step 218. Where the subject's gaze path has been used to determine the indicated images, it may be desirable to use a scoring function such as substring matching, longest common substring, or Markov chain-based string matching. For example, the subject may briefly examine all of the displayed images before deciding which image or images correspond to the story. In a substring-based scoring algorithm, a sliding window equal in size to the number of story images to be matched is used to check the substring of indicated images in the sliding window against the story images displayed. An authentication score can then be calculated by dividing the longest matching substring by the total number of story images. Scoring using a longest-common-substring algorithm or a Markov chain-based sting matching algorithm can be done similarly. Once calculated, the authentication score can be compared to a threshold and the subject authenticated if the score meets or exceeds the threshold. In some embodiments, the threshold for a subject to be authenticated as a user is 100%. In other embodiments, a lower threshold such as 80% is used instead. If the subject is authenticated, a welcome page can be displayed. If the subject is not authenticated, a failure page can be displayed instead.

Figure 3:
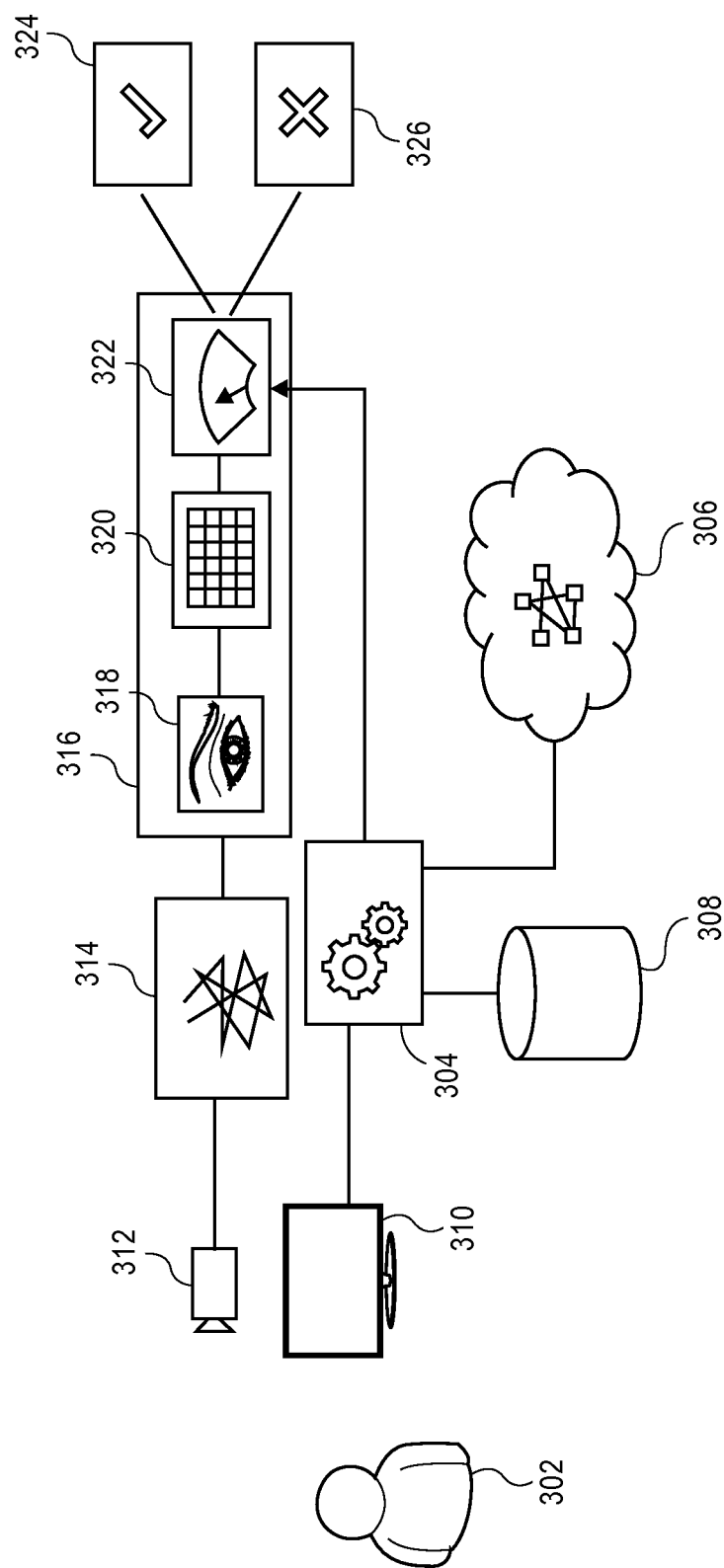
FIG. 3 depicts an exemplary system for authenticating a subject as a user suitable for certain embodiments.

Turning now to FIG. 3, an exemplary system for authenticating a subject as a user suitable for certain embodiments is depicted. As depicted, subject 302 wishes to authenticate as a user and begins by specifying the corresponding user account. In some embodiments, the user account that subject 302 wishes to access is the same local system on which the authentication methods disclosed herein operate. In other embodiments, the user account is associated with an online service remote from the computer used by subject 302, and the authentication methods are local to the service being accessed. In still other embodiments, subject 302, the service being accessed, and the authentication methods are all located in different places.

Once subject 302 has specified the user account, story generation engine 304 can construct the story to be used to authenticate subject 302. Constructing this story requires accessing one or more story images. Story generation engine 304 can retrieve these story images from the user's profile on social networking site 306. Together with the images, data describing the images (i.e. metadata) can also be retrieved. For example, if the story image tagged on social networking site 306 as depicting the user's grandmother, that information can be retrieved along with the image. As depicted, story generation engine 304 can also retrieve images from local image data store 308. As described above, story images, together with story image metadata, can be populated into local image data store 308 by the user during the process of initially enrolling the user.

Along with the story images, story generation engine 304 also retrieves one or more decoy images. As described above, decoy images can be retrieved from social networking site 306, from data store 308, or from another source of images. As described above, these other sources can include image repositories on the computer or network to which the subject is attempting to authenticate. Any other source of images with which the user is likely to be familiar can also be used as a source of story images.

Story generation engine 304 further generates a text story corresponding to the story images, as described above with respect to step 210 of method 200. Once the story images and the decoy images have been retrieved, and the corresponding text story prepared, the story can be presented to subject 302 on display 310. Display 310 can be a monitor attached to a computer, a laptop screen, the screen of a phone or tablet, or any other form of display.

Gaze tracker 312 is positioned to as to be able to track the gaze of subject 302 as they look at display 310. Any form of gaze tracking technology can be used, including eye-attached tracking, optical tracking, or electropotential tracking. When optical gaze tracking is used, infrared (either bright-pupil or dark-pupil) or visible light can be used to illuminate the eyes of subject 302. In some embodiments, small and cheap cameras such as webcams can be used. In other embodiments, gaze tracker 312 can be integrated into the system, such as by being a front-facing camera on a smartphone. In still other embodiments, a head-mounted camera such as might be present in a head-mounted display can be used. When calibrated for the user, gaze tracker 312 can determine gaze direction, typically within 2 degrees. If the subject is not the user, however, the reduced accuracy resulting from being calibrated for someone else can offer increased security even if the subject knows which images to select. In some embodiments, gaze tracker 312 can be further be used to authenticate subject 302 using the biometric data associated with subject 302's gaze, as is known in the art. However, unlike previous systems, which are subject to false negatives when a user is tired, or even when the user has consumed significant amounts of caffeine, a lower biometric authentication threshold can be used by gaze tracker 312 because of the additional authentication provided by the other components of the system.

When subject 310 looks at the story images displayed on display 310, gaze tracker 312 captures gaze data 314 corresponding to subject 310's gaze. In some embodiments, gaze data 314 comprises periodically sampled pupil direction data. This raw gaze data encodes the path taken by subject 302's eyes as they moved over the story images and decoy images on display 310. This gaze data is then processed by decision module 316 to determine whether subject 302 should be authenticated as the user. Decision module first processes gaze data 314 using eye movement classifier 318, which divides gaze data 314 into fixations and saccades. A "fixation" is where the subject's gaze pauses in a certain position for several hundred milliseconds and a "saccade" is a rapid eye movement from one fixation point to another. These fixations can be used to determine where the subject is looking and for how long.

Fixation locations can then be passed to region-of-interest mapper 320. Region-of-interest mapper 320 takes the coordinates of fixations as determined by eye movement classifier 318 and determines the corresponding story or decoy image displayed at that location. In some embodiments, fixations outside of a displayed image are discarded. In other embodiments, an image is only considered to have been viewed if a number of consecutive fixations are detected within the boundaries of the image. In some embodiments, as discussed above, the subject must view a particular area of an image. These areas can be identified as separate regions of interest and treated as separate images for the purpose of determining where the subject is looking. The string of images viewed by the subject can then be passed to scoring engine 322.

As described above, a variety of scoring functions can be used by scoring engine 322 to determine the subject's authentication score based on the string of images they have viewed. This authentication score can then be compared to a predetermined authentication threshold to determine whether the subject can be authenticated as the user they claim to be. In some embodiments, the authentication threshold can be varied based on the security level needed for the service being accessed. For example, logging into a website to leave a comment might require an authentication score of 60%, while logging in to online banking might require an authentication score of 100%. If the subject authenticates as the user, welcome page 324 can be displayed; otherwise, failure page 326 is displayed.

Figure 4:
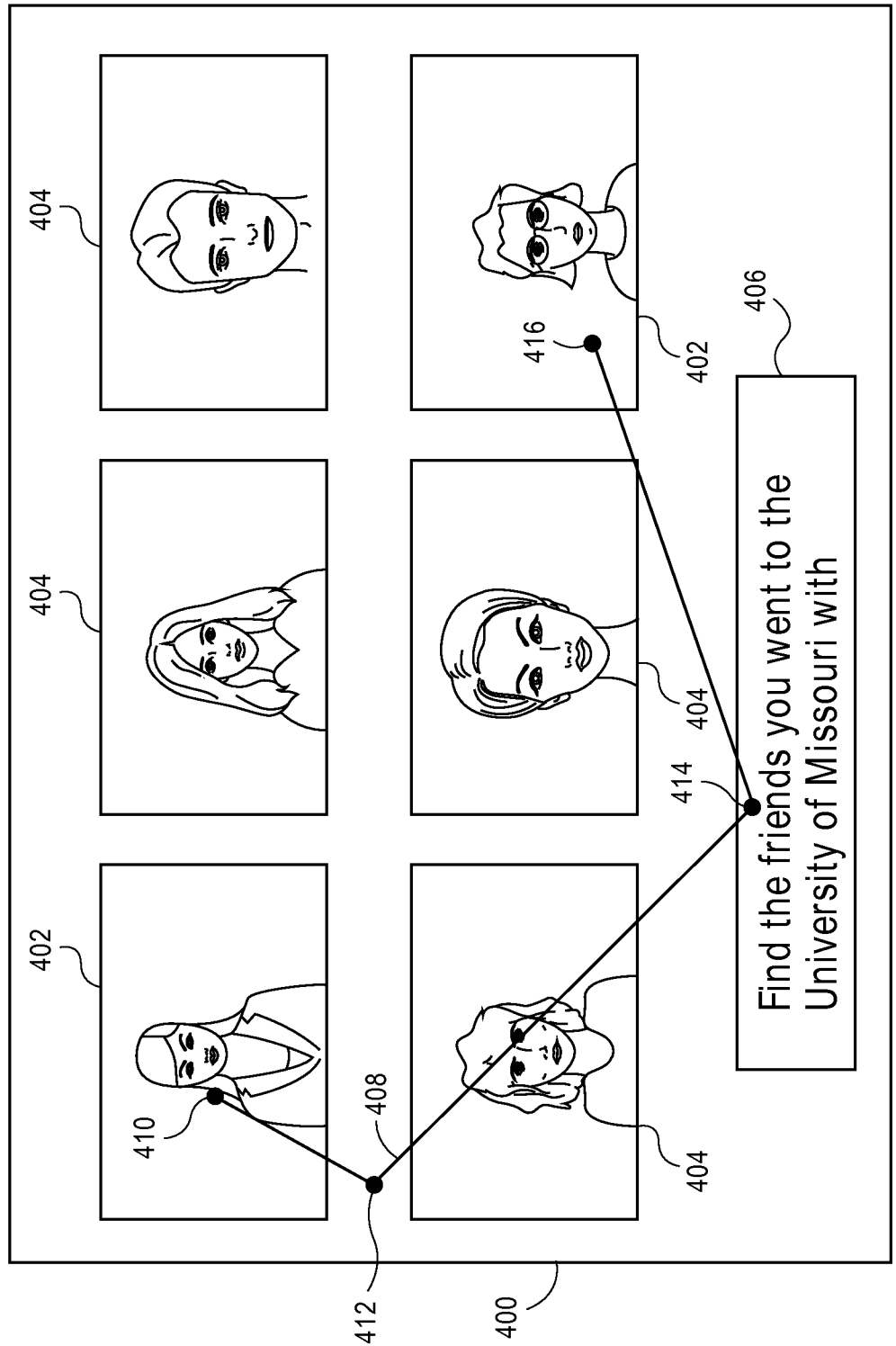
FIG. 4 depicts an exemplary visual story is depicted in accordance with certain embodiments.

Turning now to FIG. 4, an exemplary visual story is depicted in accordance with certain embodiments and referred to generally by reference numeral 400. For example, visual story 400 can be displayed on display 310. As described above, visual story includes story images 402, decoy images 404, and text story 406. In some embodiments, the story images are randomly mixed with the decoy images. Thus, for example, even if the same story images and decoy images were to be selected for two authentications, they would be presented in a different order, and so the subject's gaze would follow a different path each time. As discussed above, the number of story images and the ratio of story images to decoy images can be varied depending on the level of security needed. Thus, while visual story 400 includes six images (two story images and four decoy images), a higher security service might employ a more complex layout requiring the user to identify, in order, five story images from among twenty decoy images. In still other embodiments more or fewer images could be used instead.

Also depicted in FIG. 4 is an exemplary gaze path 408. As depicted, the user's gaze path begins with fixation 410 on one of the story images 402. As depicted, the subject's gaze then saccades to a fixation 412 which is not mapped to any region of interest. As discussed above, region-of-interest mapper 320 maps the locations of fixations to images the subject is viewing. In some embodiments, fixations such as fixation 412 that do not fall within any region of interest are discarded. In other embodiments, these fixations are instead mapped to the nearest region of interest. After fixation 412 the subject's gaze then saccades to text story 406. As discussed above, in some embodiments fixations in the region of interest corresponding to the text story are discarded, as the subject may simply be reminding themselves of the text story. Finally, the subject's gaze saccades to fixation 416, which is also in a story image. Thus, as depicted, the subject has correctly identified the story images without indicating any of the decoy images. In some embodiments, this is sufficient for authentication. In other embodiments, story images must be identified in a particular order as well.

Many different arrangements of the various components depicted, as well as components not shown, are possible without departing from the scope of the claims below. Embodiments have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope as recited in the claims.

Having thus described various embodiments, what is claimed as new and desired to be protected by Letters Patent includes the following:

1. A method of authenticating a subject as a user, comprising the steps of:
    retrieving a story image associated with the user and metadata associated with the story image;
    retrieving a plurality of decoy images based on the story image;
    generating a text story based on the metadata associated with the story image
    wherein the text story comprises a sentence associated by the user with the story image but not with the decoy images;
    presenting, to the subject, the text story together with a set of images comprising the story image and the plurality of decoy images;
    receiving, from the subject, an indication of a selected image of the set of images; and
    authenticating the subject as the user if the selected image corresponds to the story image.

2. The method of claim 1, wherein the story image associated with the user and the metadata associated with the story image are retrieved from a source selected from the set consisting of:
    a social media profile associated with the user and a local data store populated by the user.

3. The method of claim 1, wherein the story image associated with the user is retrieved from a database in which the story image associated with the user was stored during a user registration process.

4. The method of claim 1, wherein the story image associated with the user and the plurality of decoy images are presented in a random order.

5. The method of claim 1, wherein
    a plurality of story images associated with the user are presented to the subject, and
    wherein the subject is only authenticated as the user if the subject selects each of the plurality of story images associated with the user.

6. The method of claim 1, wherein the indication of the selected images of the set of images comprises a gaze directed at the selected image.

7. The method of claim 1, wherein
    the indication of the selected images of the set of images comprises further specifies a point within the selected image, and
    wherein the subject is not authenticated as the user unless the point within the selected image matches a region of interest specified by the story.

8. A system for authenticating a subject as a user, comprising:
    a display for displaying a story image associated with the user, a text story, and a plurality of decoy images together,
    wherein the text story comprises a sentence associated by the user with the story image but not with the decoy images;
    a gaze tracker for detecting a gaze path of the subject as the subject views the display;
    an eye movement classifier for identifying a fixation point of the gaze path;
    a region-of-interest mapper for determining an indicated image based on the fixation point; and
    a scoring engine for determining an authentication score based on the indicated image.

9. The system of claim 8, further comprising:
    a story generation engine configured to:
    retrieve the story image from a profile associated with the user;

retrieve the plurality of decoy images from a data store; and generate the text story associated with the story image based on a predefined grammar rule.

10. The system of claim 8, wherein the display further displays an additional story image associated with the user.

11. The system of claim 8, wherein the system further comprises a data store storing a plurality of images associated with the user.

12. The system of claim 8, wherein the story image associated with the user was sourced from a social networking profile of the user.

13. The system of claim 8, wherein the decoy images are retrieved from a data store storing a plurality of publically accessible images.

14. One or more non-transitory computer-readable media storing computer-executable instructions which, when executed by a processor perform a method of authenticating a subject as a user, comprising steps of:

retrieving a plurality of story images from a social media profile of the user and metadata associated with each of the plurality of story images;

retrieving a plurality of decoy images based on the plurality of images from the social media profile of the user;

generating a text story based on the metadata associated with each of the plurality of story images, wherein the text story comprises a sentence associated by the user with the story images but not with the decoy images;

presenting, to the subject, the text story and a set of images comprising the plurality of story images and the plurality of decoy images;

tracking the user's gaze on the set of images to obtain a gaze scan path;

analyzing the gaze scan path to determine a plurality of fixation points; and authenticating the subject as the user if the plurality of fixation points correspond to the plurality of story images.

15. The media of claim 14, wherein the text story specifies an order for the story images, wherein the step of analyzing the gaze scan path further produces an order for the fixation points, and wherein the subject is not authenticated as the user unless the order for the fixation points matches the order for the story images.

16. The media of claim 14, wherein the set of images is presented to the subject in a random order.

17. The media of claim 14, wherein a fixation point not corresponding to an image of the set of images is discarded.

18. The media of claim 14, wherein the user is not authenticated if a fixation point of the plurality of fixation points corresponds to a decoy image of the plurality of decoy images.

19. The media of claim 14, wherein the plurality of story images correspond to one or more of the set consisting of: the user's friends, places associated with the user, and events associated with the user.

20. The media of claim 14, wherein the plurality of decoy images are sourced from the user's social media profile.

* * * * *